Sept. 8, 1959 H. F. GERWIG ET AL 2,903,255
GOVERNOR
Filed June 10, 1955 3 Sheets-Sheet 1

Inventors:
Harvey F. Gerwig
and Robert M. Cox
By: Donald W. Banner Atty.

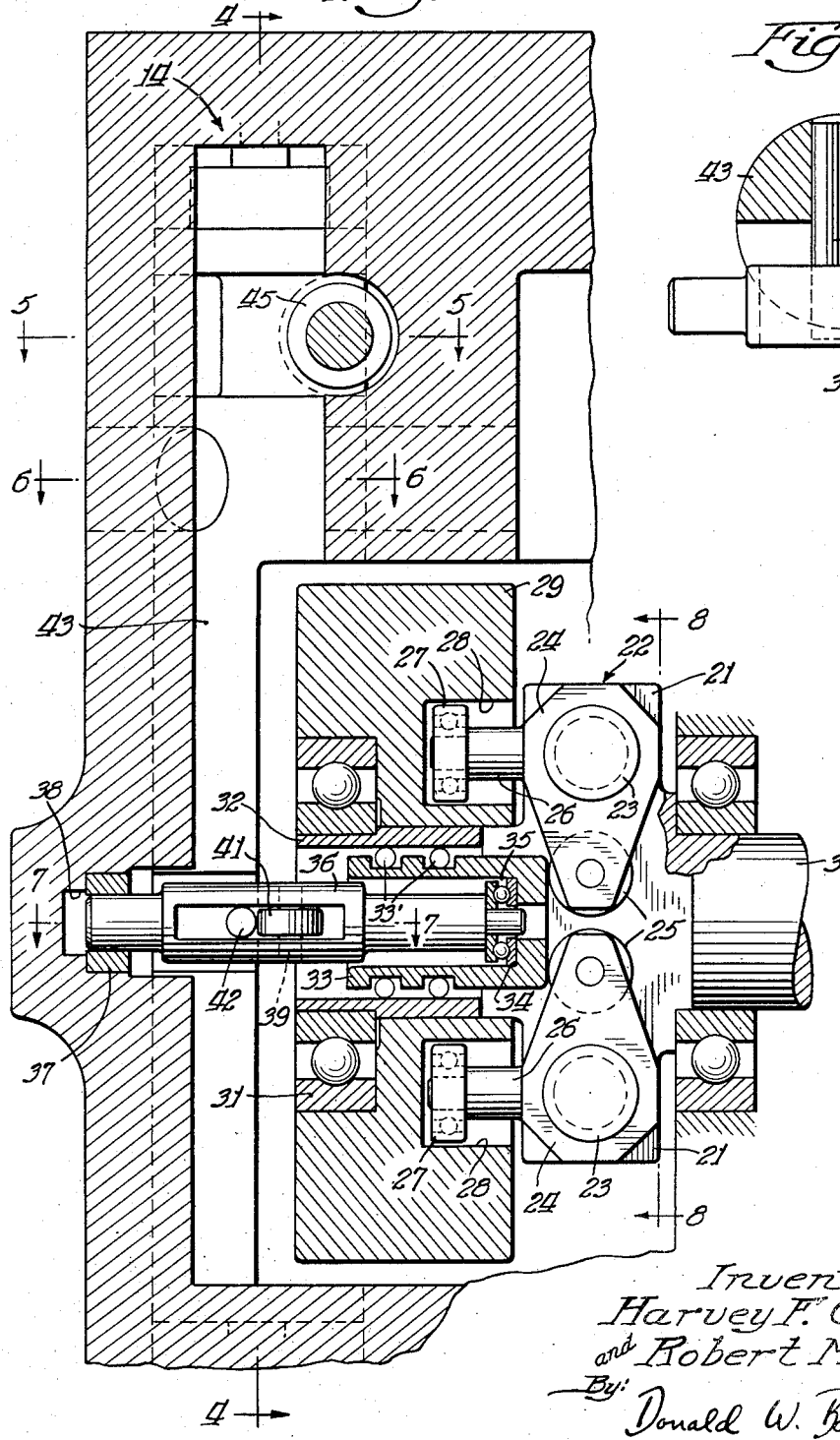
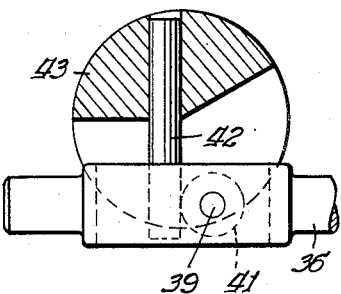

Sept. 8, 1959  H. F. GERWIG ET AL  2,903,255
GOVERNOR
Filed June 10, 1955  3 Sheets-Sheet 3

Inventors:
Harvey F. Gerwig
and Robert M. Cox
By: Donald W. Banner Atty

United States Patent Office 2,903,255
Patented Sept. 8, 1959

2,903,255

GOVERNOR

Harvey F. Gerwig, Glendale, and Robert M. Cox, Northridge, Calif., assignors to Weston Hydraulics, Ltd., North Hollywood, Calif., a corporation of California Application June 10, 1955, Serial No. 514,591

3 Claims. (Cl. 264—6)

The present invention relates to governor means, and more particularly to governor means for controlling the speed of a fluid driven motor.

One object of the present invention is the provision of governor means for controlling the speed of a fluid operated motor.

Another object is the provision of a device in accordance with the preceding object in which the governor control is such that it regulates with extreme accuracy.

Another object is the provision of a device in accordance with the preceding objects in which the governing mechanism is relatively simple and inexpensive.

Another object is the provision of a device in accordance with the preceding objects in which the governing mechanism is suitably minute, but effects control of the associated motor to such a degree that at 12,000 r.p.m. the motor speed is controlled within 0.8 of 1%.

Another object is the provision of a governing mechanism which comprises centrifugally responsive weights operative to effect linear motion of a rod operatively associated therewith, the rod effecting rotary motion of an associated valve shaft.

Another object is the provision of a device in accordance with the preceding objects in which biasing means for the valve shaft are provided having a biasing rate related to the variable force generated by the centrifugally responsive weights due to the radial position thereof.

Another object is the provision of a device in accordance with the preceding objects in which a flywheel is operatively associated with the driven shaft of the controlled motor and with the centrifugally responsive weights in such a manner as to effect movement of the weights, and consequent movement of the governor assembly, in response to changes in speeds of the driven shaft.

Other objects and features of the invention will be readily apparent to those skilled in the art from the specification and appended drawings illustrating certain preferred embodiments in which:

Figure 3 is a partial, enlarged sectional view of the left end portion of Figure 1;

Figure 7 is a sectional view along the plane of line 7—7 of Figure 3;

Figure 1:
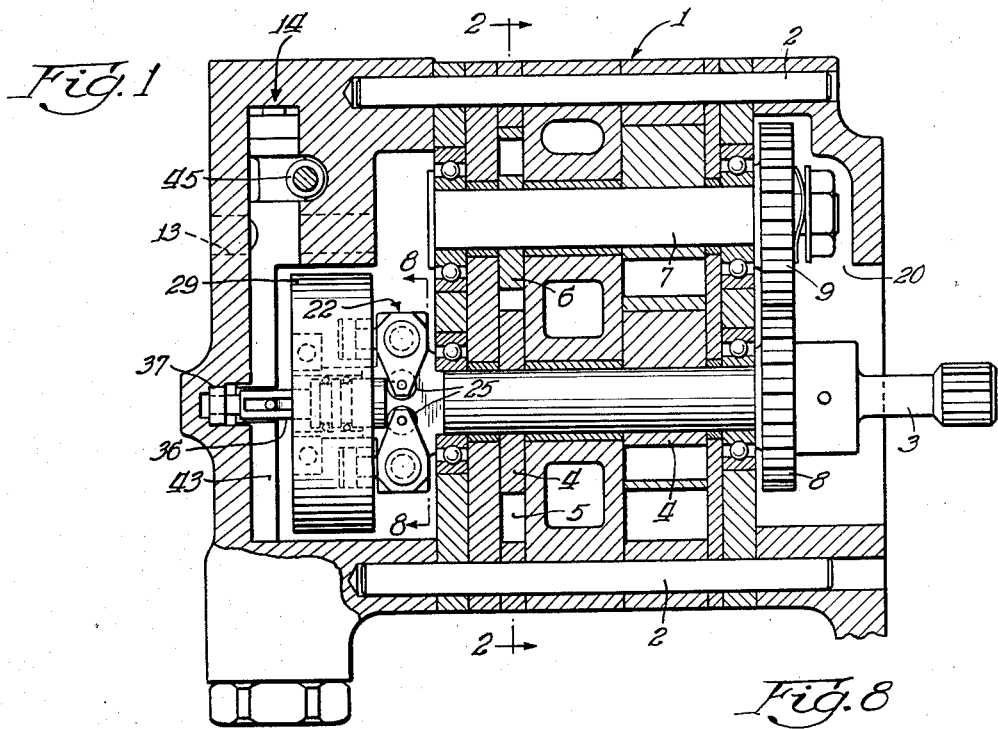
Figure 1 is a longitudinal sectional view through a fluid motor incorporating the governor means of the present invention.

Referring now to the drawings, the governing mechanism which comprises the present invention is illustrated therein as associated with a rotary abutment motor of the plural stage type, generally similar to that described in the patent to Frank F. Berry, No. 2,464,481. Devices of this type are generally well known, and in view of that fact only a brief description will be given here. The rotary abutment motor comprises, as shown in Figure 1, a multiple sectioned casing 1 having suitable means 2 maintaining the casing portions in operative relationship. Extending longitudinally through a suitable opening in the casings and having a protruding portion adapted for connection to a driven mechanism, such as an alternator, is a rotatable shaft 3, on which are mounted a plurality of rotary pistons 4. Each of the pistons 4 is disposed within a suitable chamber 5 formed by the casing 1, the pistons 4 each being so constructed and arranged as to cooperate with a rotary abutment 6 mounted upon a rotatable shaft 7 spaced from the shaft 3 and disposed parallel thereto within the casing. The shaft 3 carries a gear 8 disposed in meshing relationship with a comparable gear 9, carried by the shaft 7, so that the shafts 3 and 7 rotate together in a one-to-one relationship, but in opposite rotational direction. Extending longitudinally in the casing 1 is an inlet channel 11 adapted to communicate with the chamber 5. A return channel 12 is also provided and is adapted to communicate with the chamber 5. The channel 11 interconnects with a fluid inlet port 13, the exterior of the casing 1 being provided with suitable attachment means whereby a supply of pressurized fluid may be connected to the port 13, as is well known to those skilled in the art. The communication between the channel 11 and the pressure supply is controlled by valve means, indicated in general by the numeral 14, as will be more fully described hereinafter. The channel 12 is connected at its exhaust end to a suitable opening 20 in the casing, whereby the fluid may be exhausted.

In general, the operation of the aforedescribed device is as follows: Pressurized fluid passes through the port 13, under the control of the valve means 14, and enters into the channel 11. When the rotary abutment 6 and piston 4 are in the position illustrated in Figure 2, this pressurized fluid will enter into the chamber 5 and effect clockwise rotation of the piston 4. Rotation of the piston 4 is transmitted to the shaft 3 which drives the device attached thereto, and by virtue of the gear 8-gear 9 interconnection, also effects rotation of the shaft 7. Rotation of the shaft 7 is transmitted to the rotary abutment 6 which will be moved to a position in which the communication between the channel 11 and the chamber 5 is blocked by the abutment 6, continued expansion of the fluid in the chamber 5 effecting further rotation of the piston 4 until such time as the expanded air is exhausted through the channel 12. As previously noted, if desired, the semi-expanded air may be passed through a plurality of stages, similar to those disclosed in Figure 1, and subsequently exhausted through the opening 20. Inasmuch as devices of this general nature are well known, having been commercially available for some time and described in a variety of patents including that aforementioned, no further description now is deemed necessary.

Figures 2, 8:
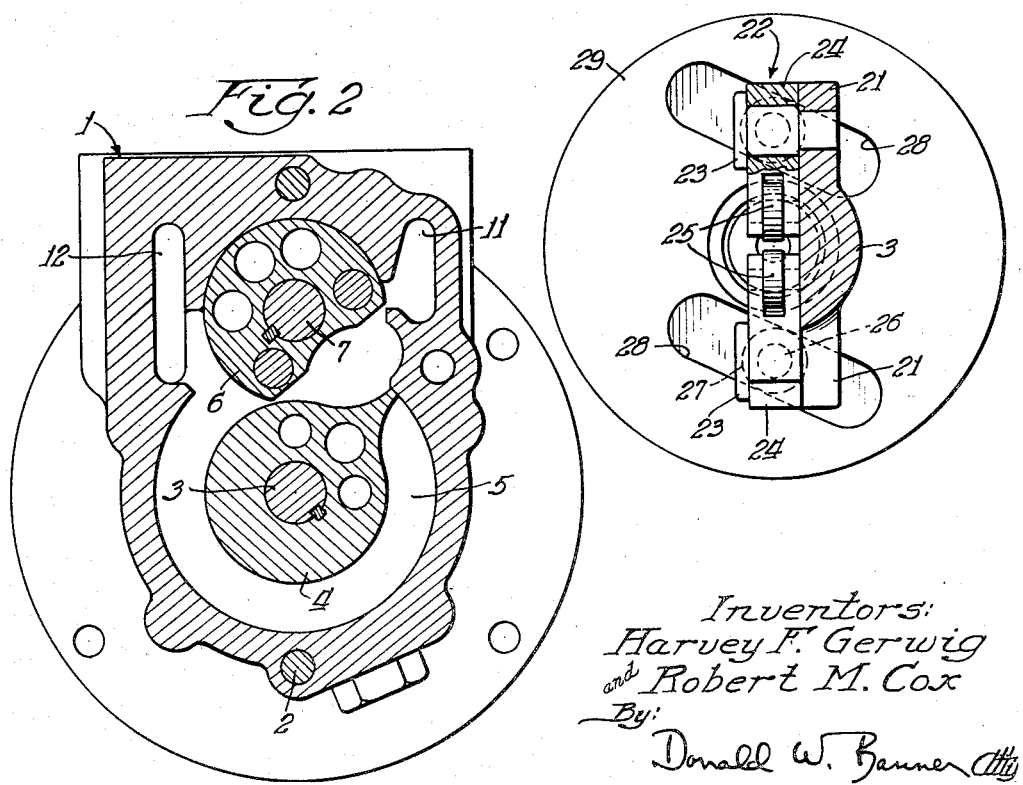
Figure 2 is a sectional view along the plane of line 2—2 of Figure 1.
Figure 8 is a sectional view along the plane of line 8—8 of Figure 3.
Figure 4:
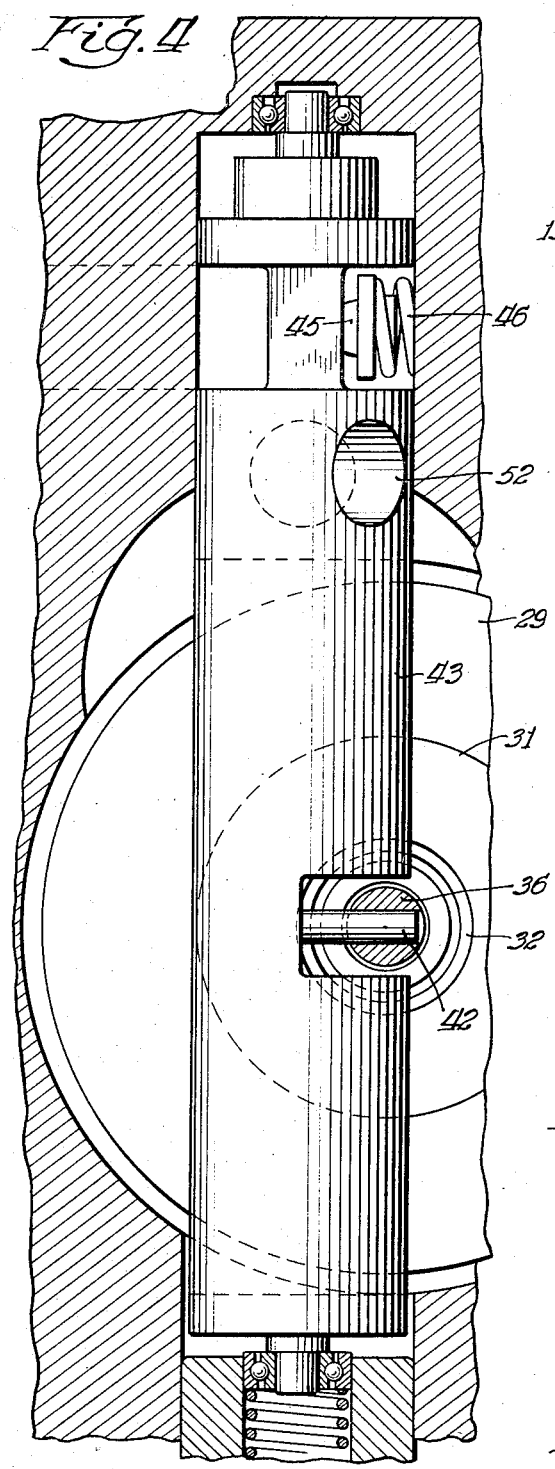
Figure 4 is a sectional view along the plane of line 4—4 of Figure 3.

Turning now to a discussion of the governing mechanism which comprises the present invention, and particularly to the Figures 3 and 8, it should be noticed that the shaft 3 has integral therewith a pair of upstanding arms 21 which extend radially in opposite directions from the shaft. At each of the arms 21, near the extremity thereof, there is pivotally mounted a lever assembly, indicated in general by the numeral 22. The lever assemblies respectively comprise a pin 23 pivotally mounted in a suitable hole in the associated arm 21, and upon which is mounted a generally L-shaped lever 24. As illustrated best in Figure 3, that portion of the lever 24 in closest proximity to the shaft 3 is provided with a roller bearing 25 for a purpose to be subsequently explained. Projecting substantially perpendicular to the radially extending portion of lever 24 is a centrifugally responsive arm 26 upon the end of which is mounted a roller bearing 27. It should be noted that the arm 26-bearing 27 combination comprises a centrifugally responsive weight assembly which will, in response to rotation of shaft 3, tend to move in a direction outwardly from the shaft 3.

Figure 5:
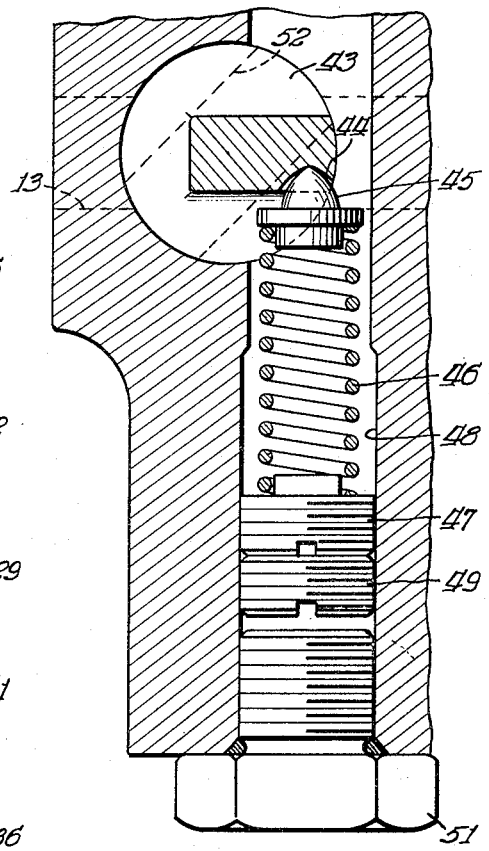
Figure 5 is a sectional view along the plane of line 5—5 of Figure 3.

Each of the bearings 27 is disposed within a slot 28 formed in a fly-wheel 29. Each of the slots 28 are formed so as to closely receive the associated bearing 27, each of the slots 28 further being formed, as best shown in Figure 8, so as to extend angularly with respect to radial lines drawn through the flywheel. The flywheel 29 is mounted upon a suitable roller bearing 31 and a cylinder 32, cylinder 32 being a part of shaft 3, as best shown in Figure 3. Disposed within the cylinder 32 is a plunger 33, suitable bearing means 33' being interposed between the plunger 33 and the cylinder 32 so that the plunger 33 may move longitudinally within the cylinder 32 with a minimum of friction. The plunger 33 is biased, by linkage, to be subsequently explained, into engagement with the bearings 25. The plunger 33 is further provided with a shoulder 34 against which is disposed a thrust bearing 35. Bearing 35 has a circular opening centrally located therein through which extends one reduced end of a push rod 36, the opposite end of which is supported by a suitable bearing 37 mounted in an opening 38 in the casing 1, the opening 38 being sufficiently large, as best illustrated in Figure 3, to permit longitudinal movement of the push rod 36. Intermediate the ends of the push rod 36 there is mounted a vertically extending pin 39 which carries a roller 41. In engagement with the roller 41 is a laterally extending arm 42 which projects perpendicularly from a valve shaft 43, rotatably mounted by suitable bearings in a vertical opening within the casing 1. The valve shaft 43 is provided with a conical opening 44 (see Figure 5), offset from the center line of the shaft 43, which receives the end of a conical plug 45. The opposite side of the plug 45 is engaged by one end of a spring 46, the opposite end of which engages an adjustment screw 47, the spring lying in a suitable transverse opening 48 provided in the casing 1 which has a threaded portion engaged by screw 47. The adjustment screw 47 is locked in a predetermined position by a lock nut 49 which is threaded in the opening 48, the ends of the opening 48 being closed by suitable terminal members 51.

Figure 6:
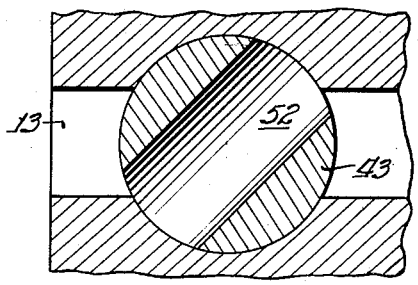
Figure 6 is a sectional view along the plane of line 6—6 of Figure 3.

As best shown in Figure 6, the valve shaft 43, in the portion adjacent the port 13, is provided with an opening 52 extending therethrough. When the shaft 3 is stationary the valve shaft 43 is biased by the spring 46 to a position in which the opening 52 is so positioned as to permit maximum fluid flow through the port 13. The bias of the spring 46 on the shaft 43 is transmitted through the arm 42 to the push rod 36, and thence through the thrust bearing 35 to the plunger 33, maintaining the inward end of the plunger 33 in engagement with the bearings 25. It will thus be seen that the spring 46 takes up all lost motion in the governor mechanism. The spring rate of spring 46, that is, the rate at which its biasing force increases as it is progressively stressed, is determined such that it is substantially the same as the centrifugal force operating on the arm 26-bearing 27 combination. In other words, it is well known that centrifugal force increases as the weight is moved outwardly from the center of rotation; spring 46 is built so that its biasing force is substantially the same as the centrifugal force aforementioned as the arm 26-bearing 27 combination is moved outwardly in response to centrifugal force.

The operation of the governing means of the present invention is as follows: In the stationary condition of the shaft 3, as previously noted, the spring 46 has rotated the valve shaft 43 to a position in which the opening 52 extending therethrough permits maximum fluid flow through the inlet port 13. Spring 46 furthermore biases the plunger 33 in such a direction that its inward end is in engagement with the bearings 25 on the lever assemblies 22. In this condition, the bearings 27 are disposed in their radially innermost positions within the slots 28. When fluid under pressure is introduced into the port 13, it will pass into the chamber 5 causing rotation of the piston 4, as previously described. Shaft 3 will, therefore, be rotated, and will increase in rotational speed until the governing mechanism operates to maintain the shaft at the desired speed. In this condition, bearings 25 will have forced plunger 33 and push rod 36 to the left from the position shown in Figure 3, and shaft 43 will then have been rotated to a position in which the slot 52 therein has been so positioned as to reduce fluid flow through port 13. If the load on shaft 3 is increased gradually, causing a reduction in speed, the centrifugal weight assemblies will move radially inwardly toward shaft 3, whereupon spring 46 will rotate shaft 43 to a position in which slot 52 permits increased fluid flow into the motor, causing it to hold the desired speed within the band of operation. The converse action, of course, also occurs when the load is gradually released from shaft 3. Assuming that the shaft 3 is rotating at a particularly desired speed, such as, for example 12,000 r.p.m., and that an external load is applied to shaft 3, shaft 3 will tend to reduce speed. As the shaft 3 tends to slow down, the flywheel 29, which is not directly connected to the shaft 3, will attempt to continue to rotate at the 12,000 r.p.m. speed. Inasmuch as an arm 26-bearing 27 assembly is disposed within each of the slots 28 of the flywheel, it may not freely rotate, but the flywheel will instead change in its positional relationship to the shaft 3. The slots 28 are relatively small so this change in relationship is approximately only 5 degrees; this is sufficient, however, to immediately force the bearings 27 radially inwardly within the slots 28. As as result, the bearings 25 connected to levers 24 are moved inwardly of the motor permitting the spring 46 to twist the valve shaft 43 toward a position in which the opening 52 through the valve shaft 43, permits a greater fluid flow into the motor. This increased fluid flow will result in a higher torque output of the motor thus balancing the added load with a small decrease in speed. Similarly, with shaft 3 rotating at the desired speed, if the load normally imposed on the shaft 3 is suddenly decreased, the normal amount of fluid supplied to the motor tends to make it overspeed. The flywheel 29 will again shift in position relative to the shaft 3 to cam the bearings 27 in a radially outward direction, which results in moving the bearings 25, attached to levers 24, outwardly of the motor. This outward movement of the bearings 25 is transmitted through the plunger 33 and the thrust bearing 35 to the push rod 36. The roller 41 on rod 36 acts on the arm 42 attached to the valve shaft 43 to move the valve shaft 43 to a position such that the opening 52 therethrough further restricts port 13. This will immediately reduce the supply of fluid to the motor until the shaft speed is once again as desired. In will be obvious that this will happen very rapidly and when the shaft speed is again at 12,000 r.p.m., the shaft and the flywheel will be once again in their original relationship one-to-the-other.

It will, therefore, be seen that the flywheel 29, by changing its relationship with the shaft 3, cooperates with the centrifugal weight assemblies comprising the arms 26 and the bearings 27 to rotate the valve shaft 43 to open and close the fluid inlet to the motor with great rapidity. With the device of the present invention, the governing range is held very accurately, the maximum variations in devices constructed in accordance with the present invention being plus or minus 0.8 of 1% with a shaft speed of 12,0000 r.p.m. This close governing range may be held over an extremely wide range of loads.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a device of the type described, a shaft adapted for rotation, a flywheel rotatably mounted on said shaft, a plurality of generally L-shaped lever means pivotally connected to said shaft at a point intermediate the ends of said lever means, anti-friction means rotatably mounted at both opposite ends of said L-shaped lever means, opening defining means in said flywheel extending angularly with respect to radii of said flywheel, said opening defining means respectively closely receiving certain of said anti-friction means on said lever means, means engaged by other of said anti-friction means movable rectilinearly in response to pivotal movement of said lever means to effect a control function, and means comprising a spring constructed and arranged to effect a varying bias substantially equal to the variable centrifugal force on said lever means as said shaft rotates at different speeds biasing said rectilinearly movable means toward one position, rotation of said flywheel relative to said shaft effecting pivotal movement of said lever means and consequent movement of said rectilinearly movable means.

2. In a device of the type described, a shaft adapted for rotation, a flywheel rotatably mounted on said shaft, means defining a central aperture in said flywheel a plurality of generally L-shaped lever means pivotally connected to said shaft at a point intermediate the ends of said lever means, anti-friction means rotatably mounted on both opposite ends of said L-shaped lever means, opening defining means in said flywheel extending angularly with respect to radii of said flywheel, said opening defining means respectively closely receiving respective ones of said anti-friction means on said lever means, means disposed in said central opening engaged by other of said anti-friction means movable rectilinearly in response to pivotal movement of said lever means to effect a control function, and means comprising a spring effective to apply a varying bias to said rectilinearly movable means substantially equal and opposite to the variable force due to centrifugal effects applied to said rectilinearly movable means by said lever means as said shaft rotates at different speeds, rotation of said flywheel relative to said shaft effecting pivotal movement of said lever means and consequent movement of said rectilinearly movable means.

3. The device defined in claim 2 in which said rectilinearly movable means comprise a cylindrical member, a thrust bearing disposed in said cylindrical member and movable rectilinearly therewith, and a control rod including a portion disposed in engagement with said thrust bearing and movable rectilinearly therewith.

References Cited in the file of this patent

UNITED STATES PATENTS

| 742,842 | Dodge | Nov. 3, 1903 |
| 758,011 | Kuhlewind | Apr. 19, 1904 |
| 1,299,428 | Cheeks | Apr. 8, 1919 |
| 2,681,220 | Purdy | June 15, 1954 |
| 2,805,549 | Hensleigh | Sept. 10, 1957 |